(12) United States Patent
Schippl

(10) Patent No.: US 7,002,273 B2
(45) Date of Patent: Feb. 21, 2006

(54) MAGNETIC BEARING

(75) Inventor: Klaus Schippl, Hannover (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 10/961,385

(22) Filed: Oct. 7, 2004

(65) Prior Publication Data

US 2005/0116565 A1 Jun. 2, 2005

(30) Foreign Application Priority Data

Nov. 27, 2003 (DE) .......................... 203 18 389 U

(51) Int. Cl.
*H02K 9/00* (2006.01)
*H02K 7/09* (2006.01)
(52) U.S. Cl. ....................... 310/90.5; 310/53
(58) Field of Classification Search ............... 310/90.5, 310/52–57; 505/166
See application file for complete search history.

(56) References Cited

U.S. PATENT DOCUMENTS

| | | | |
|---|---|---|---|
| 3,816,780 A * | 6/1974 | Smith et al. ................... 310/52 |
| 4,808,864 A * | 2/1989 | Brunet et al. .................. 310/52 |
| 5,256,638 A * | 10/1993 | Weinberger et al. ......... 505/166 |
| 5,710,469 A | 1/1998 | Ries .......................... 310/90.5 |
| 2002/0074882 A1 | 6/2002 | Werfel et al. .............. 310/90.5 |
| 2002/0145940 A1 | 10/2002 | Terentiev .................... 366/273 |
| 2004/0021382 A1 * | 2/2004 | Steinmeyer ................ 310/90.5 |
| 2004/0090139 A1 * | 5/2004 | Wang ......................... 310/261 |

FOREIGN PATENT DOCUMENTS

| | | | |
|---|---|---|---|
| DE | 4436831 | 6/1995 | ....................... 32/4 |
| DE | 19643884 | 5/1998 | ....................... 32/4 |
| DE | 10042962 | 8/2000 | ....................... 32/4 |
| DE | 19959299 | 5/2002 | |
| EP | 19643844 | 5/1998 | |
| EP | 1310690 | 5/2003 | |
| JP | 08001475 | 1/1996 | |
| JP | 08296648 | 11/1996 | ....................... 32/4 |
| JP | 2000120682 | 4/2000 | ....................... 32/4 |
| JP | 2001099156 | 4/2001 | ....................... 32/4 |
| JP | 2002181043 | 6/2002 | ....................... 32/4 |

OTHER PUBLICATIONS

German Search Report dated Feb. 17, 2004.
German Search report Mar. 22, 2005.

* cited by examiner

*Primary Examiner*—Darren Schuberg
*Assistant Examiner*—David W. Scheuermann
(74) *Attorney, Agent, or Firm*—Sofer & Haroun, LLP

(57) ABSTRACT

A magnetic bearing of a rotor shaft relative to a stator is described, which has the following features:
  (a) the rotor shaft (1) contains an arrangement of permanent-magnet elements (2) arranged side by side in the region of the stator (3);
  (b) the stator (3) has a structure (6a) with high-$T_c$ superconductor material with grains;
  (c) the high-$T_c$ superconductor material is located in/on the surface of a heat sink (6) that is arranged coaxially with the rotor shaft (1);
  (d) the heat sink (1) either has a cooling channel (8), which is also arranged coaxially with the rotor shaft (1), or is formed as a solid piece and is in contact with a cold head; and
  (e) the heat sink (6) is located inside an evacuated housing (5).

6 Claims, 1 Drawing Sheet

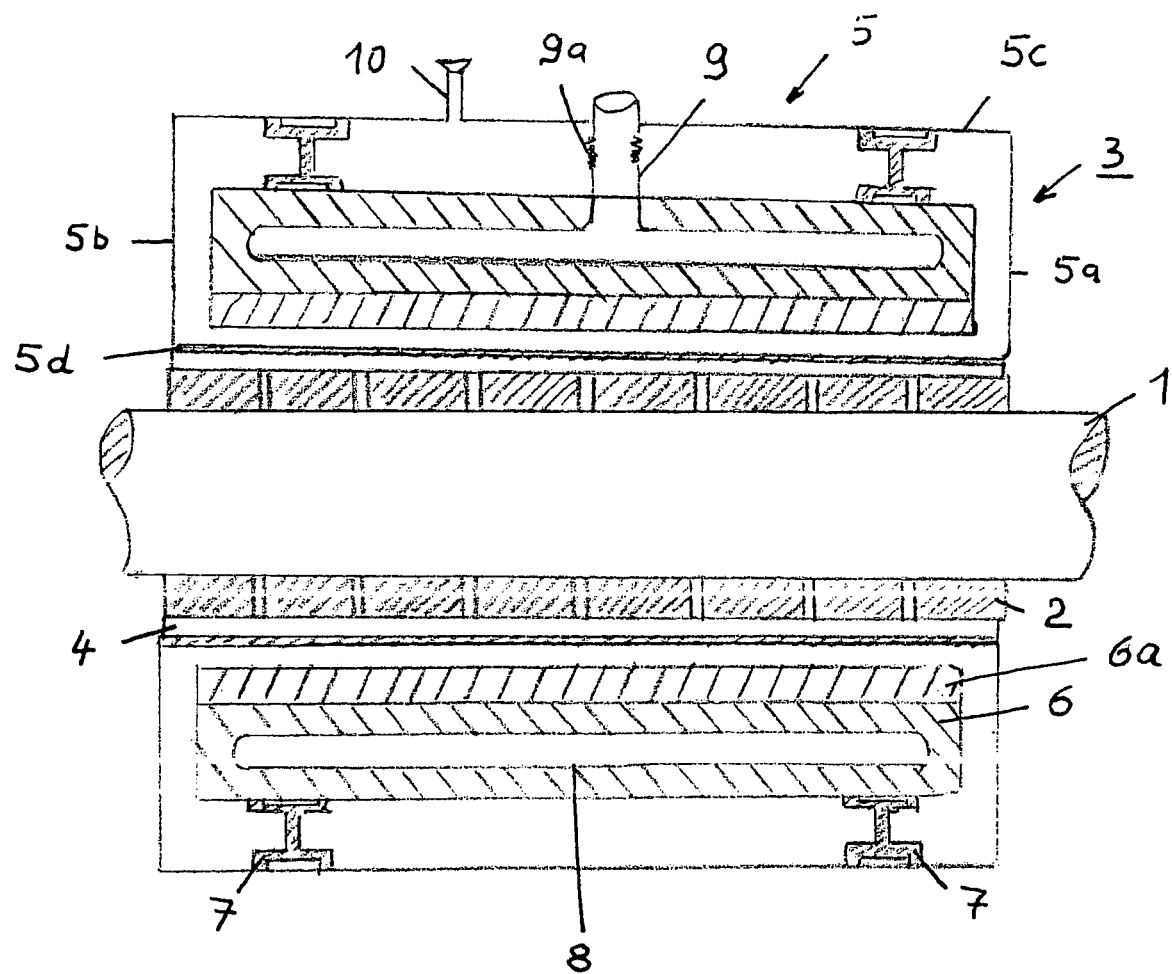

MAGNETIC BEARING

RELATED APPLICATION

This application is a based on and claims priority to German Patent Application No. 203 18 389.4, filed on Nov. 27, 2003, the entirety of which is incorporated herein by reference.

The invention concerns a magnetic bearing of a rotor shaft relative to a stator.

A passive magnetic bearing with a high-temperature superconductor is known from DE 44 36 831 C2. This previously known magnetic bearing comprises a first bearing part, which is connected with a rotor shaft, and a second bearing part, which is mounted in a stator and surrounds the first bearing part. One of the two parts of the bearing has a high-temperature superconductor. The other bearing part contains an arrangement of permanent-magnet elements arranged side by side. Adjacent permanent-magnet elements are alternately polarized. In a refinement of the invention, the permanent magnets are provided in a hollow-cylindrical arrangement on the inner bearing part (rotor shaft), and the superconductor is arranged as a hollow-cylindrical structure on the inside of a hollow-cylindrical supporting body of the outer bearing part (stator). Cooling channels for conveying liquid nitrogen for cooling the superconductor are formed in the supporting body. The liquid nitrogen is fed to the cooling channels from an external storage tank. A level alarm provides a shutoff signal when the coolant level drops below a preestablished threshold prior to any reduction in the bearing action due to warming.

Magnetic bearings of this type have recently found use, e.g., in turbomolecular pumps, ultracentrifuges, high-speed spindles of machine tools, as well as in motors, generators, turbines, and compressors.

DE 100 42 962 C1 describes a magnetic bearing with the same design that is known from DE 44 36 831 C2, in which a cooling device is provided for cooling the superconductor material of the superconductor system to an operating temperature below the transition temperature of the superconductor material. The superconductor system is enclosed by at least one thermal insulation compartment, which is filled with a protective gas or evacuated. Alternatively, the insulation compartment can be filled with insulating foam, superinsulation, insulating flakes or glass fibers. The cooling device has at least one cryogenic cooler with at least one cold head, which is thermally coupled to the superconductor system via a thermally conductive body.

The previously known magnetic bearings have the disadvantage that either there is no insulation at all for the cold region or the insulation that is provided is very expensive or is not entirely satisfactory.

Another disadvantage of the prior-art magnetic bearings is that the superconductor system is not directly enclosed by the insulation. As a result, increased cold losses must be expected, and this leads to very high costs for the operation of the bearing.

The objective of the present invention is to improve the previously known magnetic bearings in such a way that the energy expenditure for cooling the superconductor system is significantly reduced and influencing the elements surrounding the cold region is avoided (e.g., ice formation).

This objective is achieved by features (a) to (e) of claim 1.

Additional advantageous refinements of the invention are specified in the dependent claims.

The measures of the invention result in an optimum insulation system, even in the extremely narrow gap between the bearing shells, which is free of eddy currents and yet is vacuum-tight. The invention also makes it possible for high bearing forces between the cooled region and the vacuum sheath to be absorbed.

The invention is explained in greater detail below with reference to the embodiment illustrated in the drawing.

The FIGURE shows a cross section of a magnetic bearing for a rotor shaft.

The rotor shaft 1 is equipped with a large number of permanent magnets 2, which are arranged side by side and are rigidly connected with the rotor shaft 1. Adjacent permanent magnets are alternately polarized. A ferromagnetic material (not specifically shown) is provided between the permanent magnets.

The rotor shaft 1 is mounted in an outer bearing part 3. Between the rotor shaft 1 respectively, the permanent magnets 2 and the outer bearing 3, there is an air gap 4.

The outer bearing part 3 consists of a bearing housing 5, whose side sections 5a, 5b and wall region 5c, which faces away from the rotor shaft 1, are made of metal, preferably stainless steel. The inner wall section 5d consists of a nonmetallic material. A sleeve made of ceramic is preferred. The parts 5a, 5b, 5c, and 5d are joined with one another vacuum-tight.

A hollow-cylindrical heat sink 6, which is supported in the housing 5 by spacers 7, is located inside the housing 5. The heat sink 6 is made of a metal with good thermal conductivity, preferably copper. On its inner surface, the heat sink supports a structure 6a made of HTSC (High-Temperature SuperConductor) material. Materials of this type have practically no electrical resistance at temperatures below 77 K. Cooling with liquid nitrogen is possible.

The heat sink has a cooling channel 8, which is connected to the outside by a connection socket 9. The interior space of the housing 5 is evacuated to reduce the heat losses of the heat sink 6 as much as possible. A vacuum connection 10 is provided for evacuation.

The connection socket 9 is designed either completely or partially as a bellows 9a.

Superinsulation can be provided in the evacuated space between the walls of the housing 5 and the heat sink to reduce the losses still further.

What is claimed is:

1. Magnetic bearing of a rotor shaft, relative to a stator comprising:
   (a) the rotor shaft having an arrangement of permanent-magnet elements arranged side by side in the region of the stator;
   (b) the stator has a structure with high-$T_c$ superconductor material with grains;
   (c) the high-$T_c$ superconductor material is located in or on the surface of a heat sink that is arranged coaxially with the rotor shaft;
   (d) the heat sink has either one of a cooling channel which is also arranged coaxially with the rotor shaft, or is formed as a solid piece and is in contact with a cold head;
   (e) the heat sink is located inside an evacuated housing with lateral wall regions, an outer wall region, which faces away from the rotor shaft, the lateral wall regions and the outer wall region consisting of stainless steel, and an inner wall region of nonmetallic material; and
   (f) the wall regions being joined with one another vacuum-tight.

2. Magnetic bearing in accordance with claim 1, wherein the housing is also arranged coaxially with the rotor shaft and has an essentially rectangular cross section.

3. Magnetic bearing in accordance with claim 1, wherein the heat sink is supported by spacers that consist of a material of lower thermal conductivity than the outer wall region that faces away from the rotor shaft.

4. Magnetic bearing in accordance with claim 1, wherein a connection socket is provided, which connects the cooling channel with the outside and is soldered or welded vacuum-tight with the outer wall region of the housing.

5. Magnetic bearing in accordance with claim 1, wherein a vacuum pump connection is installed vacuum-tight in the outer wall region of the housing.

6. Magnetic bearing in accordance with claim 1, wherein the nonmetallic material is glass or ceramic.

* * * * *